(12) United States Patent
Hiraguchi et al.

(10) Patent No.: US 11,760,065 B2
(45) Date of Patent: Sep. 19, 2023

(54) RESIN COATED METAL SHEET FOR CONTAINER

(71) Applicant: JFE STEEL CORPORATION, Tokyo (JP)

(72) Inventors: Tomonari Hiraguchi, Tokyo (JP); Yuya Kawai, Tokyo (JP); Junichi Kitagawa, Tokyo (JP); Soichi Fujimoto, Tokyo (JP); Yasuhide Oshima, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 0 days.

(21) Appl. No.: 17/630,822

(22) PCT Filed: Jul. 31, 2020

(86) PCT No.: PCT/JP2020/029383
§ 371 (c)(1),
(2) Date: Jan. 27, 2022

(87) PCT Pub. No.: WO2021/020549
PCT Pub. Date: Feb. 4, 2021

(65) Prior Publication Data
US 2022/0274379 A1 Sep. 1, 2022

(30) Foreign Application Priority Data
Jul. 31, 2019 (JP) .................. 2019-140452

(51) Int. Cl.
*B32B 15/09* (2006.01)
*B32B 27/36* (2006.01)
(Continued)

(52) U.S. Cl.
CPC .............. *B32B 15/09* (2013.01); *B32B 27/36* (2013.01); *B32B 2250/02* (2013.01);
(Continued)

(58) Field of Classification Search
None
See application file for complete search history.

(56) References Cited

U.S. PATENT DOCUMENTS 11,518,144 B2 * 12/2022 Hiraguchi ............. B32B 37/144
2007/0036995 A1    2/2007 Suzuki et al.
(Continued)

FOREIGN PATENT DOCUMENTS

JP        2001-1448 A    1/2001
JP        2001-21496 A   1/2001
(Continued)

OTHER PUBLICATIONS

Sep. 24, 2020 International Search Report issued in International Patent Application No. PCT/JP2020/029383.
(Continued)

*Primary Examiner* — Vivian Chen
(74) *Attorney, Agent, or Firm* — Oliff PLC

(57) ABSTRACT

A resin coated metal sheet for container includes a polyester resin coating layer in which 90 mol % or more of structural units are ethylene terephthalate units. A half-value width of a peak attributable to C=O stretching vibration around 1,730 $cm^{-1}$ determined from laser Raman spectroscopic analysis measured by making a plane of polarization of linearly polarized laser light incident on a thickness direction section of the polyester resin coating layer perpendicularly to a thickness direction is 18.5 $cm^{-1}$ to 22.0 $cm^{-1}$ at a position with a thickness of 1.0 μm from a metal sheet side of the polyester resin coating layer and is greater than 17.0 $cm^{-1}$ and 18.5 $cm^{-1}$ or less at a position with a thickness of 1.0 μm from a surface side of the polyester resin coating layer.

4 Claims, 1 Drawing Sheet

(51) Int. Cl.
B65D 25/34 (2006.01)
B65D 23/08 (2006.01)

(52) U.S. Cl.
CPC ..... *B32B 2255/062* (2013.01); *B32B 2255/26* (2013.01); *B32B 2307/40* (2013.01); *B32B 2307/518* (2013.01); *B32B 2307/704* (2013.01); *B32B 2307/714* (2013.01); *B32B 2307/732* (2013.01); *B32B 2311/24* (2013.01); *B32B 2311/30* (2013.01); *B32B 2367/00* (2013.01); *B32B 2439/00* (2013.01); *B32B 2439/66* (2013.01); *B32B 2439/70* (2013.01); *B65D 23/08* (2013.01); *B65D 25/34* (2013.01)

(56) References Cited

U.S. PATENT DOCUMENTS

| | | |
|---|---|---|
| 2016/0257099 A1 | 9/2016 | Yamanaka et al. |
| 2019/0134950 A1* | 5/2019 | Hiraguchi ............ B29C 48/022 |

FOREIGN PATENT DOCUMENTS

| | | | |
|---|---|---|---|
| JP | 2003-025498 A | * | 1/2003 |
| JP | 2004-345232 A | | 12/2004 |
| JP | 2010-105263 A | * | 5/2010 |
| JP | 2016-113171 A | * | 6/2016 |
| JP | 2017-213884 A | * | 12/2017 |
| JP | 2018-140542 A | | 9/2018 |
| WO | 2015/064100 A1 | | 5/2015 |

OTHER PUBLICATIONS

A. J. Melveger, "Laser-Raman Study of Crystallinity Changes in Poly(ethylene Terephthalate)", Journal of Polymer Science vol. 10, 317-322, 1972 by John Wiley & Sons, Inc.

Koubunshi no Kotaikouzou II, "Solid Structure of Macromolecule II", 304-307, Kyoritsu Shuppan, 1984.

Mar. 8, 2022 Office Action issued in Japanese Patent Application No. 2020-555084.

* cited by examiner

RESIN COATED METAL SHEET FOR CONTAINER

FIELD

The present invention relates to a resin coated metal sheet for container including a resin coating layer at least on one face of a metal sheet.

BACKGROUND

Coating has conventionally been applied to metal sheets such as tin free steel (TFS) and aluminum used as materials for metal containers for the purpose of improving corrosion resistance and weatherability. However, this technique of applying coating has problems in that much processing time is required in a complicated coating and baking process and a large amount of solvent is discharged. Given these circumstances, to solve these problems, resin coated metal sheets for container, in which the surface of a metal sheet is coated with a thermoplastic resin film, have been developed and are being currently industrially widely used mainly for materials for beverage cans.

For resin coated metal sheets for metal container use, performance including workability and adhesion is required, and in addition, a design property, tone stability, and the like are also required. In a conventional resin coated metal sheet using polyester resin, when it is used with a resin coating surface being on a container outer face side, a whitening phenomenon, in which the resin coating layer turns white, occurs in a retort sterilization treatment process. When the whitening phenomenon occurs, the design property of the container is significantly impaired, and thus some improvements have been studied (refer to Patent Literature 1 and 2).

CITATION LIST

Patent Literature

Patent Literature 1: Japanese Patent Application Laid-open No. 2010-105263
Patent Literature 2: Japanese Patent Application Laid-open No. 2017-213884
Non Patent Literature 1: J. Polymer Science 10, 317, 1972
Non Patent Literature 2: Koubunshi no Kotaikouzou II, Kyoritsu Shuppan, 1984

SUMMARY

Technical Problem

However, when the resin coated metal sheet is used for metal containers, a reduction in the design property in the retort sterilization treatment process or the like is required to be inhibited in addition to workability and adhesion; conventional techniques cannot simultaneously achieve all of these. The technique described in Patent Literature 1 holds the resin coated metal sheet for 5 seconds or more in a batch type drying furnace after lamination to make the half-value width of a peak around 1,730 $cm^{-1}$ as an indicator of the degree of crystallization of the resin coating layer 16.0 $cm^{-1}$ or more and 24.0 $cm^{-1}$ or less to inhibit the whitening phenomenon during the retort sterilization treatment, for example. However, the long-time heat treatment for 5 seconds or more causes the crystallization of the resin coating layer to proceed to a large extent, whereby excessive crystallization reduces the adhesion and the workability of the resin coating layer. The technique described in Patent Literature 2 performs heat treatment on an unstretched resin coating layer to make the half-value width of the peak a certain value, whereby the whitening phenomenon during the retort sterilization treatment is inhibited. However, when the unstretched resin layer is used, resin chains forming the resin coating layer are not arranged in a plane direction of the resin coating layer, and thus the water barrier property of the resin coating layer is poor. Consequently, in the retort sterilization treatment on conditions likely to cause the whitening phenomenon, the whitening phenomenon cannot sufficiently be inhibited. A crystal layer having no orientation is fragile, and cracks or the like occur in the resin coating layer through harsh working when used for metal containers.

The present invention has been made in view of the above problems, and an object thereof is to provide a resin coated metal sheet for container that can inhibit workability, adhesion, and a whitening phenomenon during retort sterilization treatment.

Solution to Problem

The inventors of the present invention have earnestly conducted research in order to solve the above problems and have obtained the following knowledge. Provided are a layer having a moderate degree of crystallization and a moderate orientation property in a resin coating layer near a metal sheet side and a layer having orientation perpendicular to a thickness direction in the resin coating layer near an air side. Thus, the whitening phenomenon during the retort sterilization treatment can be inhibited without impairing workability and adhesion. The vicinity of the metal sheet side of the resin coating layer is a melted resin layer having a low degree of crystallization in order to obtain adhesion with the base metal and, on the other hand, keeps moderate orientation and crystallinity to obtain a structure that is hard to whiten in order to obtain retort whitening resistance. Such an optimum degree of crystallization and optimum orientation are strictly controlled, whereby both excellent adhesion and retort resistance can be achieved. The indicator of the optimum degree of crystallization and the optimum orientation is represented by a peak half-value width and intensity by laser Raman spectroscopy.

A resin coated metal sheet for container according to the present invention includes a polyester resin coating layer in which 90 mol % or more of structural units are ethylene terephthalate units, wherein a half-value width of a peak attributable to C=O stretching vibration around 1,730 $cm^{-1}$ determined from laser Raman spectroscopic analysis measured by making a plane of polarization of linearly polarized laser light incident on a thickness direction section of the polyester resin coating layer perpendicularly to a thickness direction is 18.5 $cm^{-1}$ to 22.0 $cm^{-1}$ at a position with a thickness of 1.0 μm from a metal sheet side of the polyester resin coating layer and is greater than 17.0 $cm^{-1}$ and 18.5 $cm^{-1}$ or less at a position with a thickness of 1.0 μm from a surface side of the polyester resin coating layer.

The resin coated metal sheet includes a part in which a ratio ($I_{90}°/I_0°$) between peak intensity ($I_{90}°$) attributable to C=C stretching vibration around 1,610 $cm^{-1}$ determined from the laser Raman spectroscopic analysis measured by making the plane of polarization of the linearly polarized laser light incident on the thickness direction section of the polyester resin coating layer perpendicularly to the thickness direction and peak intensity ($I_0°$) measured by making the plane of polarization of the linearly polarized laser light incident on the thickness direction section of the polyester resin coating layer parallel to the thickness direction may be 1.8 or more at a 2.0 μm position from the metal sheet side of the polyester resin coating layer.

The polyester resin coating layer may be used on a container outer face side after container forming.

Advantageous Effects of Invention

The present invention can provide a resin coated metal sheet for container that can inhibit workability, adhesion, and a whitening phenomenon during retort sterilization treatment.

DESCRIPTION OF EMBODIMENTS

The following describes a resin coated metal sheet for container as one embodiment of the present invention. Note that in the following, "%" indicates "% by mass" unless otherwise specified.

Figure 1:
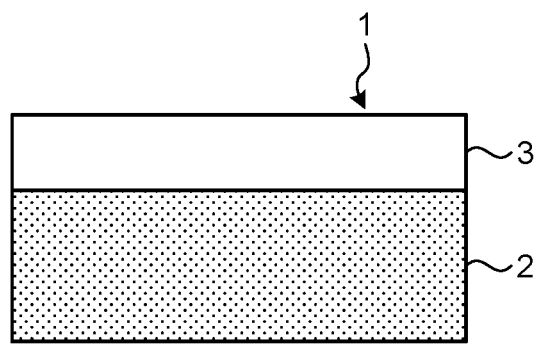
FIG. 1 is a sectional view of a configuration of a resin coated metal sheet for container as one embodiment of the present invention.

FIG. 1 is a sectional view of a configuration of the resin coated metal sheet for container as one embodiment of the present invention. As illustrated in FIG. 1, this resin coated metal sheet 1 for container as one embodiment of the present invention includes a metal sheet 2 and a resin coating layer 3.

The metal sheet 2 is formed of a steel sheet such as tinplate or tin free steel. As tinplate, one with a plating amount of 0.5 g/m$^2$ or more and 15 g/m$^2$ or less is preferably used. Tin free steel preferably has a metallic chromium layer with a deposition amount of 50 mg/m$^2$ or more and 200 g/m$^2$ or less and a chromium oxide layer with a deposition amount in terms of the metallic chromium layer of 3 mg/m$^2$ or more and 30 g/m$^2$ or less on the surface. The type of the steel sheet, which is not limited to a particular one so long as it can be molded into a target shape, is preferably one with the following components or methods of manufacture.

(1) One subjected to recrystallization annealing by continuous annealing using low carbon steel with a C (carbon) amount of about 0.010% or more and 0.10% or less.
(2) One subjected to recrystallization annealing and overaging by continuous annealing using low carbon steel with a C amount of about 0.010% or more and 0.10% or less.
(3) One subjected to recrystallization annealing by box annealing using low carbon steel with a C amount of about 0.010% or more and 0.10% or less.
(4) One subjected to recrystallization annealing by continuous annealing or box annealing and then secondary cold rolling (double reduced (DR) rolling) using low carbon steel with a C amount of about 0.010% or more and 0.10% or less.
(5) One subjected to recrystallization annealing by continuous annealing using interstitial free (IF) steel in which elements fixing C such as Nb and Ti are added to an ultralow carbon steel with C amount of about 0.003% or less.

The mechanical properties of the metal sheet are not limited to particular properties so long as it can be molded into a target shape; the yield point (YP) being 220 MPa or more and 580 MPa or less gives an excellent balance between workability and strength, which is preferred. The Lankford value (the r value) as an indicator of plasticity anisotropy is preferably 0.8 or more. Furthermore, the in-plane anisotropy Δr of the r value preferably has an absolute value of 0.7 or less.

The components of the steel for achieving the above properties, which are not limited to particular components, may contain components such as Si, Mn, P, S, Al, and N. The Si content is preferably 0.001% or more and 0.1% or less, the Mn content is preferably 0.01% or more and 0.6% or less, the P content is preferably 0.002% or more and 0.05% or less, the S content is preferably 0.002% or more and 0.05% or less, the Al content is preferably 0.005% or more and 0.100% or less, and the N content is preferably 0.0005% or more and 0.020% or less. Other components such as Ti, Nb, B, Cu, Ni, Cr, Mo, and V may be contained.

The resin coating layer 3 is a polyester in which 90 mol % or more of structural units of the polyester are ethylene terephthalate units. The proportion is more preferably 95 mol % or more.

The polyester resin forming the resin coating layer 3 may be copolymerized with various dicarboxylic acid components or glycol components to the extent that workability and the like are not impaired. Examples of the dicarboxylic acid components include aromatic dicarboxylic acids such as isophthalic acid, naphthalene dicarboxylic acid, diphenyldicarboxylic acid, diphenyl sulfone dicarboxylic acid, diphenoxyethane dicarboxylic acid, 5-sodium sulfoisophthalic acid, and phthalic acid; aliphatic dicarboxylic acids such as oxalic acid, succinic acid, adipic acid, sebacic acid, dimer acid, maleic acid, and fumaric acid; alicyclic dicarboxylic acids such as cyclohexanedicarboxylic acid; and oxycarboxylic acids such as p-oxybenzoic acid. Examples of the glycol components include aliphatic glycols such as ethylene glycol, propanediol, butanediol, pentanediol, hexanediol, and neopentyl glycol; alicyclic glycols such as cyclohexane dimethanol; aromatic glycols such as bisphenol A and bisphenol S; and diethylene glycol.

The resin material forming the resin coating layer 3 is not limited by its method of manufacture. In manufacturing the polyester, additives such as fluorescent whitening agents, antioxidants, thermal stabilizers, ultraviolet absorbers, antistatic agents, and lubricants may be added as needed.

Figure 2:
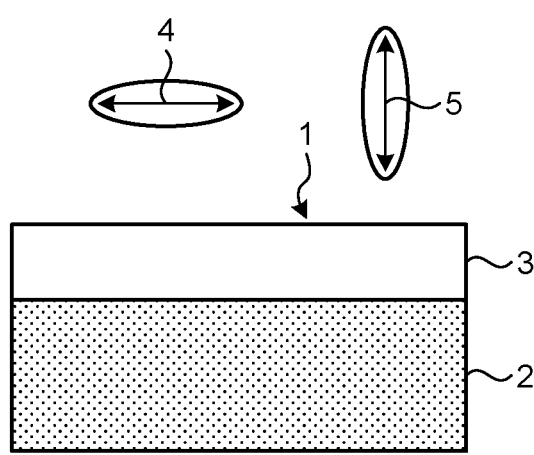
FIG. 2 is a diagram of polarization directions of a laser in laser Raman spectroscopy.

FIG. 2 illustrates polarization directions of a laser in laser Raman spectroscopy used in the present invention. It is known that the half-value width of a peak based on C=O stretching vibration around 1,730 cm$^{-1}$ determined from laser Raman spectroscopy is correlated with the density of a polyester resin (Non-Patent Literature 1, for example). It is known that there is correlation between the density and the volume fraction degree of crystallization of a resin (Non-Patent Literature 2, for example). Consequently, the half-value width of the peak based on C=O stretching vibration around 1,730 cm$^{-1}$ is measured, whereby the degree of crystallization of the polyester can be determined via the density of the polyester. In the present invention, the half-value width of the peak based on C=O stretching vibration around 1,730 cm$^{-1}$ determined from laser Raman spectroscopy is used as an indicator of the degree of crystallization.

Normally, for an unstretched film, a value of laser Raman spectroscopic analysis using linearly polarized laser light in a thickness direction section indicated by the symbol 5 in FIG. 2 is used. However, it has been revealed that when a stretched film is used as in the present invention, just managing such a value of average information of the resin layer is insufficient. In the present invention, as an indicator of the degree of crystallization of the stretched film, using linearly polarized laser light in a direction perpendicular to the thickness direction of the resin layer indicated by the symbol 4 in FIG. 2, the half-value width of the peak is prescribed in each of the vicinity of the metal sheet and the vicinity of the surface. That is to say, the half-value width of the peak attributable to C=O stretching vibration around 1,730 $cm^{-1}$ determined from laser Raman spectroscopic analysis measured by making a plane of polarization of linearly polarized laser light incident on a thickness direction section of a polyester resin layer perpendicularly to a thickness direction is 18.5 $cm^{-1}$ or more and 22.0 $cm^{-1}$ or less at a position with a thickness of 1.0 μm from a metal sheet side of the resin coating layer and is greater than 17.0 $cm^{-1}$ and 18.5 $cm^{-1}$ or less at a position with a thickness of 1.0 μm from a surface side of the resin coating layer.

The peak intensity of Raman spectroscopic analysis using polarized laser light is correlated with the amount of bonding corresponding to crystals oriented in a plane of polarization. Consequently, $I_{90}°/I_0°$ of a peak based on C=C stretching vibration around 1,610 $cm^{-1}$ is determined, whereby the degree of orientation of the polyester resin can be determined. When the polyester resin forming the resin coating layer is not oriented (when it is isotropic), no difference occurs between $I_{90}°$ and $I_0°$, and thus $I_{90}°/I_0°$ is 1. On the other hand, when the polyester resin forming the resin coating layer is oriented perpendicularly to the thickness direction, $I_{90}°/I_0°$ is a value larger than 1, and the value becomes larger as the degree of orientation increases. When $I_{90}°/I_0°$ is 1.8 or more at a position with a thickness of 2.0 μm from the metal sheet side, there is a layer having a moderate crystallinity and a moderate degree of orientation in the resin coating layer near the metal sheet, which is more preferred.

Prescription of the peak half-value width range at the position with a thickness of 1.0 μm from the metal sheet side is important in achieving both adhesion and inhibition of a whitening phenomenon during retort sterilization treatment. This whitening phenomenon is attributable to air bubbles formed by water vapor having passed through a film in an early stage of the retort sterilization treatment, cooled by contents at low temperature near a metal sheet interface to be condensed, and vaporizing along with an increase in the temperature of the contents. Thus, it is necessary that the degree of crystallization of the resin layer near the metal sheet interface be increased to harden it and to inhibit swelling of the air bubbles.

On the other hand, when the degree of crystallization of the resin coating layer near the metal sheet interface is extremely high, adhesion between the metal sheet and the resin coating layer is impaired. Thus, to achieve both adhesion and inhibition of the whitening phenomenon, it is necessary that the half-value width of the peak around 1,730 $cm^{-1}$ determined from laser Raman spectroscopic analysis measured by making incident perpendicularly to the thickness direction be 18.5 $cm^{-1}$ or more and 22.0 $cm^{-1}$ or less at the position with a thickness of 1.0 μm from the metal sheet side. When the half-value width of the peak is less than 18.5 $cm^{-1}$, the adhesion of the resin coating layer is insufficient. On the other hand, when the half-value width of the peak is greater than 22.0 $cm^{-1}$, the whitening phenomenon during the retort sterilization treatment cannot be inhibited. Furthermore, from the viewpoint of inhibiting air bubble swelling, the half-value width of the peak is preferably 20.5 $cm^{-1}$ or less. The half-value width of the peak at the position with a thickness of 1.0 μm from the surface side of the resin coating layer being greater than 17.0 $cm^{-1}$ and 18.5 $cm^{-1}$ or less is important from the viewpoint of workability and a water vapor barrier property. When the half-value width is 17.0 $cm^{-1}$ or less, the orientation of the surface of the film is extremely high, and prese workability accompanied by a high-speed shape change is poor. When the half-value width is greater than 18.5 $cm^{-1}$, a water vapor passing amount during a retort is excessively large, and the whitening phenomenon cannot be inhibited even though the degree of crystallization of the resin layer near the metal sheet interface is increased.

To control the resin coating layer 3 to be within the range prescribed in the present invention, two-step strict control including (1) a biaxially stretched film is bonded to the metal sheet through thermal fusion bonding with a thermal history managed and (2) the metal sheet is subjected to short-time heat treatment may be performed.

The following first describes the process (1). To control the resin coating layer 3 to be within the range prescribed in the present invention, it is necessary that the resin coating layer 3 after thermal fusion bonding be melted in the vicinity of the metal sheet interface and be oriented on a surface layer side. To melt the vicinity of the metal sheet interface of the resin coating layer 3, the temperature of the metal sheet at the start of thermal fusion bonding is preferably +5° C. or more and +30° C. or less based on the melting point of the resin coating layer 3. The temperature of the metal sheet at the start of thermal fusion bonding is set at the melting point +5° C. or more, whereby the part of the resin coating layer 3 near the metal sheet melts, and excellent adhesion can be obtained. When the temperature of the metal sheet at the start of thermal fusion bonding is greater than the melting point +30° C., the resin coating layer 3 is excessively melted to be softened, which may adversely affect a surface shape or the like, and thus the temperature of the metal sheet at the start of thermal fusion bonding is preferably the melting point of the resin coating layer 3+30° C. or less.

To make the surface layer side of the resin coating layer 3 a plane-oriented state, it is necessary that a plane-oriented state formed during manufacture of the biaxially stretched film be held without melting the surface layer side of the resin coating layer 3. For this purpose, the temperature of a lamination roll pressure bonding the biaxially stretched film to the metal sheet during thermal fusion bonding is preferably, based on the melting point of the resin coating layer 3, (the melting point—100)° C. or less. The temperature of the lamination roll is set at (the melting point—100)° C. or less, whereby the surface of the biaxially stretched film can be inhibited from being heated at the melting point or more during thermal fusion bonding, and the orientation state of the biaxially stretched film can be held. The lamination roll temperature is preferably (the melting point—120° C.) of the resin coating layer or less and more preferably (the melting point—200° C.) of the resin coating layer or more and (the melting point—140° C.) or less.

The time during which the film is pressure bonded to the metal sheet by the lamination roll (a nip time) is preferably short-time pressure bonding in order to keep the orientation and is preferably 5 msec or longer and 40 msec or shorter. When the nip time is shorter than 5 msec, the time during which the film thermally flows cannot sufficiently be ensured, and wettability to the metal sheet may be insufficient, and adhesion may degrade. On the other hand, when the nip time is longer than 40 msec, orientation keeping cannot sufficiently be kept, and thus the nip time is preferably 40 msec or shorter.

The following describes the process (2). The process (2) is a process of subjecting the metal sheet to short-time heat treatment to moderately crystallize the metal sheet side of the resin coating layer and to adjust the degree of crystallization of the resin coating layer 3 to be the range of the present invention. Examples of the method of heating include methods of heating using an induction heater and near-infrared rays (NIR). In a method of heating with a high atmospheric temperature (heating by an air-heating furnace, for example), the temperature rising rate of the metal sheet is low, and thus long-time heating is required. Owing to the long-time heating, crystallization excessively proceeds, and thus the degree of crystallization of the resin coating layer near the metal sheet cannot be controlled to the range prescribed in the present invention.

To control the degree of crystallization of the resin coating layer on the metal sheet side to the range of the present invention, it is important to control the time required for a heat treatment process. The heat treatment process can be divided into three processes including (a) a process of raising the temperature of the metal sheet up to a certain temperature, (b) a process of holding the certain temperature, and (c) a process of cooling the metal sheet. The time required for the process (a) is preferably 2 sec or shorter. When the time required for the process (a) is longer than 2 sec, heating equipment greatly increases in size in a continuous manufacturing line with a line speed of greater than 100 mpm in particular.

The time required for the process (b) is preferably 2 sec or more and 4 sec or shorter. When the holding time is shorter than 2 sec, the crystallization of the resin coating layer near the steel sheet is insufficient, and it is hard to inhibit the whitening phenomenon during the retort sterilization treatment. When the holding time is longer than 4 sec, the crystallization of the resin coating layer near the steel sheet excessively proceeds, whereby adhesion between the steel sheet and the resin coating layer degrades. Furthermore, the crystallization of the resin coating layer proceeds during the temperature raising process as well, and thus the total time of the process (a) and the process (b) is preferably shorter than 5 sec. The heating treatment temperature is preferably 140 to 190° C. This temperature range is a temperature range in which the crystallization rate of the polyester resin with polyethylene terephthalate as a main component as the target of the present invention is high. The heating treatment temperature is more preferably 150 to 180° C. For the holding process after reaching the certain temperature, the temperature is required to be controlled so as to be held within the range of this temperature range.

The process (c) does not limit the method of cooling to a particular method; from the viewpoint of controlling the degree of crystallization, preferred is cooling from the heat treatment temperature to a temperature of 80° C. or less within 2 sec. When the time required for cooling is longer than 2 sec, an equipment length greatly increases, and in addition, crystallization may excessively proceed during the long-time cooling process, and the degree of crystallization of the resin coating layer on the metal sheet side may not be able to be controlled to the range of the present invention.

EXAMPLES

Both faces of a metal sheet were coated with each of resin coating layers of the inventive examples and the comparative examples listed in Table 1A by film lamination (film thermal fusion bonding). As the metal sheet, tin free steel (TFS, metallic Cr layer: 120 mg/m$^2$ and Cr oxide layer: 10 mg/m$^2$ in terms of metallic Cr, the degree of tempering: T3CA) with a thickness of 0.22 mm was used. The coating conditions are as listed in Table 1A. The metal sheet was heated, the resin coating layer in biaxially stretched film form was thermally pressure bonded to the metal sheet by a lamination roll, and after a lapse of 1 sec from thermal pressure bonding, the metal sheet was water cooled, whereby a sample with both faces of the metal sheet coated with the resin coating layer was produced. The produced resin coated metal sheet was subjected to heat treatment on conditions listed in Table 1A. For Raman spectroscopic analysis, LabRAM HR Evolution manufactured by Horiba Ltd. was used. A laser wavelength was 532 nm, a 100-power objective was used, and an aperture diameter was set at 25 μm. A diffraction grating was 300 gr/mm, whereas a focal length was 800 mm.

For the resin coated metal sheets of the inventive examples and the comparative examples, evaluations of whitening during the retort sterilization treatment, adhesion, and workability were performed by methods shown below. Table 1B lists evaluation results of whitening during the retort sterilization treatment, adhesion, and workability. As listed in Table 1B, for the resin coated metal sheets for container of the inventive examples, whitening during the retort sterilization treatment, adhesion, and workability were all good, whereas for those of the comparative examples, any of the evaluation results was insufficient.

(1) Evaluation of Whitening during Retort Sterilization Treatment

The resin coated metal sheet was molded into a can such that the resin coating layer to be evaluated would be on a can outer face side, distilled water was charged into the inside of the can, and then a lid was seamed. Subsequently, the can body was placed in a retort apparatus with the can bottom directed downward and was subjected to retort sterilization treatment at 125° C. for 90 min, and then 20° C. water was charged into the inside of the retort apparatus to rapidly cool the can body. The bottom of the can body after rapid cooling was observed and was evaluated in accordance with the following criteria.

Evaluation "4": There is no whitening.

Evaluation "3": Pale whitening is observed in an area of 3% or less in terms of areal percentage. There is no problem in practical use.

Evaluation "2": Whitening is observed in an area of greater than 3% and 50% or less in terms of areal percentage. There is no problem in practical use.

Evaluation "1": Whitening is observed in an area of greater than 50% in terms of areal percentage. There is a problem in practical use.

(2) Evaluation of Adhesion

Paraffin wax was applied to the resin coated metal sheet, then a disc with a diameter of 200 mm was punched out of it and was drawn into a cup with a drawing ratio of 2.00 by a cupping press such that the resin coating layer to be evaluated would be on a can outer face side. Subsequently, the obtained cup was subjected to two-step redrawing so as to give a drawing ratio of 2.20 and 2.50, and a can flange part was trimmed to obtain a redrawn can. The obtained can body was subjected to retort sterilization treatment at 125° C. for 90 min by a retort apparatus. The trimmed part of the can body after the retort sterilization treatment was observed and was evaluated in accordance with the following criteria.

Evaluation "4": There is no peeling.

Evaluation "3": Through a whole circumference observation, peeling with 1 mm or less at most is observed. There is no problem in practical use.

Evaluation "2": Through a whole circumference observation, peeling with greater than 1 mm and 3 mm or less at most is observed. There is no problem in practical use.

Evaluation "1": Through a whole circumference observation, peeling with greater than 3 mm at most is observed. There is a problem in practical use.

(3) Evaluation of Workability

Paraffin wax was applied to the resin coated metal sheet, then a disc with a diameter of 200 mm was punched out of it and was drawn into a cup with a drawing ratio of 2.00 by a cupping press such that the resin coating layer to be evaluated would be on a can outer face side. Subsequently, the obtained cup was subjected to two-step redrawing so as to give a drawing ratio of 2.20 and 2.50, and the can bottom was subjected to panel working. The can bottom panel worked part of the obtained can body was observed and was evaluated in accordance with the following criteria.

Evaluation "4": There is no damage in the film after forming.

Evaluation "3": Slight damage is partially observed in the film after forming. There is no problem in practical use.

Evaluation "2": Partial damage is observed in the film after forming. There is no problem in practical use.

Evaluation "1": Light damage is observed in the whole circumference of the film after forming. There is a problem in practical use.

TABLE 1

| | | | Laminating conditions | | Post-lamination heating | | | |
|---|---|---|---|---|---|---|---|---|
| | | Film stretching | Metal sheet temperature °C. | Nip time msec | Heating method | Heating temperature °C. | Temperature rising time sec | Time until cooling sec |
| Comparative Example | 1 | Biaxial stretching | 257 | 18.3 | IR | 180 | 1 | 3 |
| Inventive Example | 2 | Biaxial stretching | 267 | 18.3 | IR | 180 | 1 | 3 |
| Inventive Example | 3 | Biaxial stretching | 270 | 18.3 | IR | 180 | 1 | 3 |
| Inventive Example | 4 | Biaxial stretching | 275 | 18.3 | IR | 180 | 1 | 3 |
| Inventive Example | 5 | Biaxial stretching | 267 | 17.6 | IR | 180 | 1 | 3 |
| Inventive Example | 6 | Biaxial stretching | 267 | 23.1 | IR | 180 | 1 | 3 |
| Inventive Example | 7 | Biaxial stretching | 267 | 28.1 | IR | 180 | 1 | 3 |
| Inventive Example | 8 | Biaxial stretching | 267 | 30.0 | IR | 180 | 1 | 3 |
| Comparative Example | 9 | Biaxial stretching | 267 | 34.1 | IR | 180 | 1 | 3 |
| Comparative Example | 10 | Biaxial stretching | 267 | 18.3 | IR | 180 | 1 | 1 |
| Inventive Example | 11 | Biaxial stretching | 267 | 18.3 | IR | 180 | 1 | 2 |
| Comparative Example | 12 | Biaxial stretching | 267 | 18.3 | IR | 180 | 1 | 6 |
| Inventive Example | 13 | Biaxial stretching | 267 | 18.3 | IR | 180 | 2 | 3 |
| Inventive Example | 14 | Biaxial stretching | 267 | 18.3 | IR | 180 | 1 | 4 |
| Inventive Example | 15 | Biaxial stretching | 267 | 18.3 | IR | 180 | 1 | 4 |
| Inventive Example | 16 | Biaxial stretching | 267 | 18.3 | IR | 180 | 1 | 4 |
| Inventive Example | 17 | Biaxial stretching | 267 | 18.3 | IR | 140 | 1 | 3 |
| Inventive Example | 18 | Biaxial stretching | 267 | 18.3 | IR | 160 | 1 | 3 |
| Inventive Example | 19 | Biaxial stretching | 267 | 18.3 | IR | 170 | 1 | 3 |
| Comparative Example | 20 | Biaxial stretching | 267 | 18.3 | IR | 200 | 1 | 3 |
| Comparative Example | 21 | Biaxial stretching | 267 | 18.3 | Air-heating furnace | 180 | 14 | 3 |
| Inventive Example | 22 | Biaxial stretching | 267 | 18.3 | IR | 180 | 1 | 3 |
| Inventive Example | 23 | Biaxial stretching | 267 | 28.1 | IR | 180 | 1 | 3 |
| Inventive Example | 24 | Biaxial stretching | 267 | 18.3 | IR | 180 | 1 | 3 |
| Inventive Example | 25 | Biaxial stretching | 267 | 23.1 | IR | 180 | 1 | 3 |
| Inventive Example | 26 | Biaxial stretching | 267 | 23.1 | IR | 180 | 1 | 3 |

TABLE 1-continued

| | | | | | | | | |
|---|---|---|---|---|---|---|---|---|
| Comparative Example | 27 | Unstretched | 267 | 18.3 | IR | 180 | 1 | 3 |
| Comparative Example | 28 | Biaxial stretching | 267 | 23.4 | IR | 150 | 1 | 10 |
| Comparative Example | 29 | Biaxial stretching | 267 | 23.4 | IR | 180 | 1 | 5 |
| Comparative Example | 30 | Biaxial stretching | 267 | 23.4 | IR | 200 | 1 | 5 |
| Comparative Example | 31 | Biaxial stretching | 245 | 23.4 | IR | 180 | 1 | 10 |
| Comparative Example | 32 | Biaxial stretching | 248 | 23.4 | IR | 180 | 1 | 10 |

| | | Metal sheet side of film section | | Surface side of film section | Properties | | |
|---|---|---|---|---|---|---|---|
| | | 1.0 μm Position Half-value width of 1730 cm$^{-1}$ C=O peak [cm$^{-1}$] | 2.0 μm Position Intensity ratio $I_{90°}/I_{0°}$ of 1610 cm$^{-1}$ C=C peak | 1.0 μm Position Half-value width of 1730 cm$^{-1}$ C=O peak [cm$^{-1}$] | Whitening during retort treatment | Adhesion | Workability |
| Comparative Example | 1 | 18.0 | 2.4 | 18.0 | 4 | 1 | 4 |
| Inventive Example | 2 | 20.2 | 2.3 | 18.0 | 4 | 4 | 4 |
| Inventive Example | 3 | 20.5 | 2.2 | 18.0 | 4 | 4 | 4 |
| Inventive Example | 4 | 21.0 | 2.1 | 18.0 | 3 | 4 | 4 |
| Inventive Example | 5 | 19.7 | 2.6 | 18.0 | 4 | 4 | 4 |
| Inventive Example | 6 | 21.5 | 1.8 | 18.0 | 3 | 4 | 4 |
| Inventive Example | 7 | 21.7 | 1.6 | 18.0 | 2 | 4 | 4 |
| Inventive Example | 8 | 21.9 | 1.5 | 18.0 | 2 | 4 | 4 |
| Comparative Example | 9 | 23.5 | 1.4 | 18.0 | 1 | 4 | 4 |
| Comparative Example | 10 | 22.2 | 1.4 | 18.2 | 1 | 4 | 4 |
| Inventive Example | 11 | 21.3 | 1.6 | 18.1 | 2 | 4 | 4 |
| Comparative Example | 12 | 17.9 | 2.1 | 18.0 | 3 | 1 | 4 |
| Inventive Example | 13 | 18.6 | 2.8 | 17.6 | 4 | 4 | 4 |
| Inventive Example | 14 | 18.5 | 2.8 | 17.6 | 4 | 4 | 4 |
| Inventive Example | 15 | 20.5 | 1.7 | 17.6 | 3 | 4 | 4 |
| Inventive Example | 16 | 21.8 | 1.5 | 17.6 | 2 | 4 | 4 |
| Inventive Example | 17 | 22.0 | 1.2 | 17.8 | 2 | 4 | 4 |
| Inventive Example | 18 | 20.5 | 2.4 | 18.1 | 4 | 4 | 4 |
| Inventive Example | 19 | 18.6 | 2.5 | 17.1 | 4 | 4 | 3 |
| Comparative Example | 20 | 22.2 | 1.4 | 18.2 | 1 | 4 | 4 |
| Comparative Example | 21 | 17.0 | 1.8 | 17.0 | 4 | 1 | 1 |
| Inventive Example | 22 | 19.8 | 1.8 | 17.4 | 4 | 4 | 3 |
| Inventive Example | 23 | 21.0 | 1.6 | 17.4 | 3 | 4 | 3 |
| Inventive Example | 24 | 21.8 | 2.2 | 18.5 | 3 | 4 | 4 |
| Inventive Example | 25 | 22.0 | 1.8 | 18.4 | 3 | 4 | 4 |
| Inventive Example | 26 | 22.0 | 1.5 | 18.4 | 2 | 4 | 4 |
| Comparative Example | 27 | 22.1 | 1.1 | 21.7 | 1 | 4 | 1 |
| Comparative Example | 28 | 21.0 | 0.9 | 17.0 | 3 | 1 | 1 |

TABLE 1-continued

| | | | | | | | |
|---|---|---|---|---|---|---|---|
| Comparative Example | 29 | 20.0 | 1.0 | 16.0 | 4 | 1 | 1 |
| Comparative Example | 30 | 20.0 | 1.1 | 16.0 | 4 | 1 | 1 |
| Comparative Example | 31 | 20.5 | 1.2 | 17.0 | 4 | 3 | 1 |
| Comparative Example | 32 | 20.0 | 1.2 | 17.0 | 4 | 3 | 1 |

INDUSTRIAL APPLICABILITY

The present invention can provide a resin coated metal sheet for container that can inhibit workability, adhesion, and a whitening phenomenon during retort sterilization treatment.

REFERENCE SIGNS LIST

1 RESIN COATED METAL SHEET FOR CONTAINER USE
2 METAL SHEET
3 RESIN COATING LAYER

The invention claimed is:

1. A resin coated metal sheet for a container, the resin coated metal sheet comprising:
a polyester resin coating layer in which 90 mol % or more of structural units are ethylene terephthalate units, the polyester resin coating layer being a biaxially stretched film,
wherein a half-value width of a peak attributable to C=O stretching vibration around 1,730 $cm^{-1}$ determined from laser Raman spectroscopic analysis measured by making a plane of polarization of linearly polarized laser light incident on a thickness direction section of the polyester resin coating layer perpendicularly to a thickness direction is:
18.5 $cm^{-1}$ to 22.0 $cm^{-1}$ at a position with a thickness of 1.0 μm from a metal sheet side of the polyester resin coating layer, and
greater than 17.0 $cm^{-1}$ and 18.5 $cm^{-1}$ or less at a position with a thickness of 1.0 μm from a surface side of the polyester resin coating layer.

2. The resin coated metal sheet according to claim 1, wherein a ratio ($I_{90°}/I_{0°}$) is 1.8 or more in at least a part of the polyester resin coating layer at a 2.0 μm position from the metal sheet side of the polyester resin coating layer, wherein:

$I_{90°}$ a peak intensity attributable to C=C stretching vibration around 1,610 $cm^{-1}$ determined from the laser Raman spectroscopic analysis measured by making the plane of polarization of the linearly polarized laser light incident on the thickness direction section of the polyester resin coating layer perpendicularly to the thickness direction, and $I_{0°}$ is a peak intensity determined from Raman spectroscopic analysis measured by making the plane of polarization of the linearly polarized laser light incident on the thickness direction section of the polyester resin coating layer parallel to the thickness direction.

3. The resin coated metal sheet according to claim 2, wherein the polyester resin coating layer is used on a container outer face side after container forming.

4. The resin coated metal sheet according to claim 1, wherein the polyester resin coating layer is used on a container outer face side after container forming.

* * * * *